2,863,851
Patented Dec. 9, 1958

2,863,851

STABILIZATION OF POLYMERIZABLE MATERIALS

Joseph L. O'Brien, Philadelphia, Pa., assignor to Rohm & Haas Company, Philadelphia, Pa., a corporation of Delaware No Drawing. Application June 27, 1955
Serial No. 518,402

13 Claims. (Cl. 260—45.9)

This invention relates to the stabilization of liquid materials which polymerize by addition polymerization.

It is well known that many materials which contain olefinic unsaturation—and which are defined in greater detail below—have a tendency to polymerize on being heated or on merely being stored (cf. U. S. Patents 2,351,658; 2,361,538; 2,653,172; and 2,678,945). The tendency to polymerize is so great in many cases that the monomeric materials cannot be purified by distillation, for example. In other instances, the materials autopolymerize during storage or transportation with resultant loss of the materials and great inconvenience.

The main object of this invention, therefore, is to provide a particularly efficient means of stabilizing materials, such as linear, unsaturated polyesters and those liquid monomeric compounds which contain at least one vinylidene group of the formula, $CH_2=C<$, against polymerization.

This object is accomplished by incorporating in such a polymerizable, and hence unstable, liquid material a relatively small amount of the compound N,N'-di-2-(1,4-naphthoquinonyl)-p-phenylenediamine of the formula

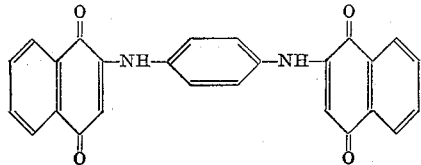

This compound acts as an inhibitor of polymerization of unsaturated alkyl resins and those ethylenically unsaturated organic compounds which undergo addition polymerization. It stabilizes such inherently unstable materials; and the words "stabilizer" and "inhibitor" are therefore used synonymously herein. The above-identified compound has a combination of low volatility and high stabilizing or inhibiting ability which makes it especially effective for use with polymerizable compounds which are subjected to high temperatures. Also, it is essentially inert toward the unsaturated materials whose polymerization it inhibits. The preparation of the compound N,N'-di-2-(1,4-naphthoquinonyl)-p-phenylenediamine is described in Elsevier's Encyclopedia of Organic Chemistry, volume 12B, page 2967, Elsevier Publishing Company, 1952. The original reference is R. Pummerer and K. Brass, Ber. 44, 1653 (1911).

The optimal amount of the above stabilizer which is used depends on the particular polymerizable material which is to be stabilized and on the range of temperature to which the latter is to be exposed. When the unstable material is to be heated—as, for example, in the purification or isolation of a monomeric compound by distillation—it is found that as little as 0.1% of the stabilizer can often be used, based on the weight of the material to be stabilized. Obviously higher amounts can be used; although there does not appear to be any advantage in using more than 2%. For that matter, in the distillation of a single batch of polymerizable compound, the ratio of stabilizer to polymerizable compound increases of necessity in the pot as distillation progresses. The stabilizer has also been used completely successfully in continuous purification by distillation of polymerizable monomers. In that process, the liquid monomer— typified by methyl methacrylate—is merely introduced continuously into the pot containing the stabilizer at about the same rate as the monomer is distilled therefrom. The stabilizer remains in the pot and inhibits the polymerization of the monomer which would otherwise occur at the pot-temperatures. Under normal conditions of storage and transportation the stabilizer has been effective in amounts as low as 0.005%, on the same weight basis. Under such conditions, there does not appear to be any advantage in employing more than about 1%; and, in fact, the amount used is often governed by the solubility of the stabilizer in the polymerizable material. The instant stabilizer has very low solubility in many of the unstable, polymerizable materials; but it is, nevertheless, effective as an inhibitor at such levels of concentration.

The ethylenically unsaturated, organic compounds which contain at least one non-conjugated group of the structure, $CH_2=C<$, and which are stabilized by the process of this invention are well-known in the resin art. Scores of them are identified, for instance, in U. S. Patent 2,580,901 to which reference is made. They are typified by the following: acrylic and methacrylic acids and their derivatives, such as acrylamide, methacrylamide, acrylonitrile, methacrylonitrile, methacrylyl chloride, methyl methacrylate, ethyl acrylate, butyl acrylates, octyl methacrylates, glycidyl methacrylate, isopropylidene-glyceryl methacrylate, 3,3,5-trimethylcyclohexyl acrylate and other esters of these acids; vinyl hydrocarbons, such as styrene, vinyltoluene, ethylstyrene, vinylnaphthalene, vinylanthracene, divinylbenzene and trivinylbenzene; derivatives of vinyl alcohol, such as vinyl bromide, vinyl acetate, vinyl propionate; vinyl acetals such as vinyl butyral; vinylidene chloride; N-vinylethyleneurea; allyl esters such as diallyl phthalate, diallyl succinate and triallyl trimesate.

Unsaturated, linear polyesters—or "unsaturated alkyd resins," as they often are called—are also inhibited from polymerizing by addition polymerization, especially when mixed with monomeric compounds such as those described above. These unsaturated polyesters are also well-known; and their preparation and use are shown in the patent literature (e. g., U. S. Patents 2,255,313; 2,409,633; and 2,443,735). They are made by the esterification of an $\alpha,\beta$-unsaturated dicarboxylic acid, such as maleic or fumaric acids, with a dihydric alcohol, such as ethyleneglycol, propyleneglycol, or 1,6-hexanediol. They can also contain one or more esterified dicarboxylic acids which are free of non-benzenoid unsaturation, such as adipic, sebacic or phthalic acids. It is apparent that the stabilizer of this invention can be used to stabilize mixtures of polymerizable materials such as mixtures of monomeric esters of acrylic and methacrylic acids. In fact, the inhibitor is used very effectively in the stabilization, during storage and shipment, of those resinous compositions which are used in laminating and casting, in conjunction with glass fibers, and which are usually solutions of linear, unsaturated polyesters in monomeric styrene.

It is recommended that the inhibitor of this invention be added in the form of a solution—preferably in ethanol—to the fluid, polymerizable materials which require stabilization.

As is evident from the above discussion, the stabilizer is readily separated from polymerizable materials by means of distillation of the latter. In other instances, it can be removed, if necessary, by adsorption on conventional adsorbants such as diatomaceous earth or clay, or it can be extracted with suitable solvents. Or, its inhibiting effect can be overcome by the addition of a dominant amount of a polymerization catalyst of the free-radical type, typified by tert-butyl hydroperoxide.

The following examples, in which all parts are by weight, further illustrate the effectiveness of N,N'-di-2-(1,4-naphthoquinonyl)-p-phenylenediamine as a stabilizer or inhibitor.

Example 1

To a crude reaction mixture containing both 10,11-epoxyundecyl methacrylate and 10-undecenyl methacrylate (from which the former was made) was added 1% by weight of the above-identified compound, N,N'-di-2-(1,4-naphthoquinonyl)-p-phenylenediamine. The mixture was distilled through a short Vigreux column under reduced pressure. The product which was collected at 115° to 122° C./0.1 mm. amounted to approximately 60% of the original mixture and was identified as the 10,11-epoxyundecyl methacrylate component of the original mixture. This product was colorless and entirely free of inhibitor, as shown by the fact that a sample polymerized readily when it was heated with 0.5% benzoyl peroxide at 60° C.

In contrast, when attempts were made to separate the components of the reaction mixture in the absence of the inhibitor, the entire mass in the pot gelled before the boiling point was reached; and no separation of the components could be effected.

Example 2

One hundred parts of glycidyl methacrylate, containing one part of N,N'-di-2-(1,4-naphthoquinonyl)-p-phenylenediamine, was refluxed at a temperature of 90° C. and at a pressure of 20 mm. for three hours, after which the ester was distilled. Recovery of the distilled ester was 98.8% and the product was entirely free of the inhibitor. In the absence of the inhibitor, glycidyl methacrylate polymerized to a gelatinous mass in less than three hours at the same refluxing temperature.

Example 3

N,N'-di-2-(1,4-naphthoquinonyl)-p - phenylenediamine serves as an excellent stabilizer during the preparation and purification of polymerizable compounds in general. For example, pure methacrylyl chloride was prepared as follows: A total of 714 parts of thionyl chloride and 0.25 part of N,N'-di-2-(1,4-naphthoquinonyl)-p-phenylenediamine was placed in a reactor equipped with reflux condenser, stirrer, thermometer and dropping funnel. Next 431 parts of methacrylic acid was added slowly over a period of an hour. The mixture was then heated to refluxing temperature and was held there until the liberation of HCl had ceased. The reaction mixture was distilled through a fractionating column and yielded 415 parts of purified methacrylyl chloride which was completely free of inhibitor.

In the absence of the inhibitor, the methacrylyl chloride could not be distilled successfully.

Example 4

In a reactor equipped with condenser, stirrer, thermometer and dropping funnel was placed 44.6 parts of N-(β-chloroethyl)ethyleneurea, 174 parts of anhydrous toluene, 16.2 parts of powdered sodium methoxide and 0.33 part of N,N'-di-2-(1,4-naphthoquinonyl)-p-phenylenediamine. The stirred mixture was heated and distillate was taken off as fresh toluene was added simultaneously to the reactor. When the vapor temperature reached 110° C., the mixture was filtered to remove sodium chloride. Toluene was stripped under reduced pressure from the filtrate, after which the residue was distilled to give 20.5 parts of N-vinyl-N,N'-ethyleneurea which boiled at 102° to 112° C. at .25 mm. of mercury. The product solidified on cooling (M. P. 78° to 79° C.).

It was impossible to carry out the above reaction without an inhibitor. Furthermore, the polymerizable product was not contaminated with the inhibitor.

Example 5

Five hundred parts of methyl methacrylate, 86 parts of 4-penten-1-ol, 6 parts of N,N'-di-2-(1,4-naphthoquinonyl)-p-phenylenediamine and 6 parts of p-toluenesulfonic acid were charged to a reactor equipped with stirrer, thermometer, a 20" packed column and a condenser. The reaction mixture was heated and distilled until 31 parts (83% of theory) of distillate was collected. The reaction mixture was cooled to room temperature and the acid catalyst was neutralized by the addition of 3 parts of sodium acetate. After filtration, the reaction mixture was again heated and the excess methyl methacrylate was removed by distillation through a Vigreux column at a pressure of 80 to 100 mm. (Hg). Thereafter, the product, 4-pentenyl methacrylate, was purified by distillation at 80° to 85° C./15 mm. (Hg). An 81.5% yield was obtained. The product was free of the inhibitor as evidenced by its normal rate of polymerization when it was treated with 1% benzoyl peroxide.

The above transesterification reaction could not be carried out in the absence of the inhibitor due to gelation by polymerization of the reaction mixture.

Example 6

This procedure resembled that of Example 5, except that a basic—rather than an acidic—catalyst was employed. A mixture of 750 parts of methyl methacrylate, 129 parts of 4-penten-1-ol and 8.8 parts of N,N'-di-2-(1,4-naphthoquinonyl)-p-phenylenediamine was charged to the reactor. The reactor was heated at a maximum vapor-temperature of 70° C. for 6 hours during which time a solution of 0.5 part of sodium dissolved in 8 parts of methanol was slowly added. During this time a total of 63.5 parts of distillate was collected. Then the excess methyl methacrylate was removed by distillation through a Vigreux column at a pressure of 80 to 100 mm. (Hg). Finally, the product, 4-pentenyl methacrylate, was isolated in a pure, inhibitor-free condition at 80° to 85° C./15 mm. (Hg). At no stage in this procedure was there any evidence of polymerization.

Example 7

To a reactor, equipped with stirrer, thermometer, addition funnel and condenser, was charged a mixture of 179 parts of 4-pentenyl methacrylate and 3 parts of N,N'-di-2-(1,4-naphthoquinonyl)- p - phenylenediamine. Next, a solution of 220.4 parts of a 40% solution of peracetic acid in acetic acid and 6.6 parts of sodium acetate was added over a period of 30 minutes at 40° to 45° C. The temperature was maintained thereafter at 40° to 45° C. for five hours. Then 200 parts of water was added to the reaction mixture and the resultant mixture was extracted twice with benzene. The extract was thoroughly washed and then dried over magnesium sulfate. After being filtered, the benzene solution was treated with 2 parts of N,N'-di-2-(1,4 - naphthoquinonyl) - p - phenylenediamine and the benzene was stripped off through a Vigreux column at 120 mm. (Hg). The product, 4,5-epoxypentyl methacrylate, was then distilled at 55° to 75° C./35 mm. It was finally re-fractionated in the presence of 1% of the same inhibitor at 69° to 74° C./0.35 mm. (Hg). At no stage of this procedure was there any evidence of polymerization.

From the above, it is evident that this invention provides a particularly efficient method of stabilizing, by means of N,N'-di-2-(1,4-naphthoquinonyl)-p-phenylenediamine, those ethylenically unsaturated compounds which are capable of undergoing addition polymerization. Not only does it provide a means of stabilizing such compounds under conditions normally encountered in storage and transportation, but it also makes it possible to prepare polymerizable compounds, under either acidic or alkaline conditions and at high temperatures, without loss of the compounds by polymerization. The invention also furnishes a method of obtaining pure, monomeric, polymerizable compounds by distillation.

I claim:

1. A composition comprising a polymerizable ester of acrylic acid and, as a stabilizer therefor, from 0.005% to about 1%, based on the weight of said ester, of the compound, N,N'-di-2-(1,4-naphthoquinonyl)-p-phenylenediamine.

2. A composition comprising a polymerizable ester of methacrylic acid and, as a stabilizer therefor, from 0.005% to about 1%, based on the weight of said ester, of the compound, N,N'-di-2-(1,4-naphthoquinonyl)-p-phenylenediamine.

3. A composition comprising a polymerizable aromatic vinyl hydrocarbon and, as a stabilizer therefor, from 0.005% to about 1%, based on the weight of said vinyl hydrocarbon, of the compound, N,N'-di-2-(1,4-naphthoquinonyl)-p-phenylenediamine.

4. A process for inhibiting the polymerization of a polymerizable ester of acrylic acid which comprises mixing with said ester from 0.005% to about 1%, based on the weight of said ester, of the compound, N,N'-di-2-(1,4-naphthoquinonyl)-p-phenylenediamine.

5. A process for inhibiting the polymerization of a polymerizable ester of methacrylic acid which comprises mixing with said ester from 0.005% to about 1%, based on the weight of said ester, of the compound, N,N'-di-2-(1,4-naphthoquinonyl)-p-phenylenediamine.

6. A process for inhibiting the polymerization of a polymerizable aromatic vinyl hydrocarbon which comprises mixing with said vinyl hydrocarbon from 0.005% to about 1%, based on the weight of said hydrocarbon, of the compound, N,N'-di-2-(1,4-naphthoquinonyl)-p-phenylenediamine.

7. A composition comprising a polymerizable material from the class consisting of (a) unsaturated linear polyesters having an ethylenic group capable of undergoing addition polymerization and (b) liquid monomeric compounds which contain an ethylenic group capable of undergoing addition polymerization and, as a stabilizer therefor, 0.005% to 2%, based on the weight of said polymerizable material, of the compound, N,N'-di-2-(1,4-naphthoquinonyl)-p-phenylenediamine.

8. A composition comprising a polymerizable material from the class consisting of (a) unsaturated linear polyesters having an ethylenic group capable of undergoing addition polymarization and (b) liquid monomeric compounds which contain an ethylenic group capable of undergoing addition polymerization and, as a stabilizer therefor, from 0.005% to about 1%, based on the weight of said polymerizable material, of the compound, N,N'-di-2-(1,4-naphthoquinonyl)-p-phenylenediamine.

9. A composition comprising a polymerizable unsaturated linear polyester having an ethylenic group capable of undergoing addition polymerization and, as a stabilizer therefor, from 0.005% to 1%, based on the weight of said polyester, of the compound, N,N'-di-2-(1,4-naphthoquinonyl)-p-phenylenediamine.

10. A process for inhibiting the polymerization of a polymerizable material from the class consisting of (a) unsaturated linear polyesters having an ethylenic group capable of undergoing addition polymerization and (b) liquid monomeric compounds which contain an ethylenic group capable of undergoing addition polymerization which comprises mixing with said polymerizable material 0.005% to 2%, based on the weight of said polymerizable material, of the compound, N,N'-di-2-(1,4-naphthoquinonyl)-p-phenylenediamine.

11. A process for inhibiting the polymerization of a polymerizable material from the class consisting of (a) unsaturated linear polyesters having an ethylenic group capable of undergoing addition polymerization and (b) liquid monomeric compounds which contain an ethylenic group capable of undergoing addition polymerization which comprises mixing with said polymerizable material from 0.005% to about 1%, based on the weight of said polymerizable material, of the compound, N,N'-di-2-(1,4-naphthoquinonyl)-p-phenylenediamine.

12. A process for inhibiting the polymerization of a polymerizable unsaturated linear polyester having an ethylenic group capable of undergoing addition polymerization which comprises mixing with said linear polyester from 0.005% to about 1%, based on said linear polyester, of the compound, N,N'-di-2-(1,4-naphthoquinonyl)-p-phenylenediamine.

13. A process for inhibiting the polymerization during distillation of a polymerizable compound which contains an ethylenic group capable of undergoing addition polymerization which comprises distilling said polymerizable compound in the presence of about 0.1% to 2%, based on the weight of said polymerizable compound, of the compound, N,N'-di-2-(1,4-naphthoquinonyl)-p-phenylenediamine.

References Cited in the file of this patent

UNITED STATES PATENTS

| | | |
|---|---|---|
| 2,280,242 | Kropa et al. | Apr. 21, 1942 |
| 2,632,753 | Anderson | Mar. 24, 1953 |